United States Patent [19]

Woodnutt

[11] 3,893,002
[45] July 1, 1975

[54] SWITCH-CONTROLLED CONTINUOUSLY PROGRESSIVE DIMMER CIRCUIT

[76] Inventor: John Peter Woodnutt, 119 Cleveland St., London, England

[22] Filed: Feb. 19, 1974

[21] Appl. No.: 443,387

[30] Foreign Application Priority Data
Feb. 21, 1973 United Kingdom............... 8562/73

[52] U.S. Cl. ............... 315/291; 315/171; 315/199; 315/205; 315/240; 315/362
[51] Int. Cl. ...................... H05b 37/02; H05b 39/04
[58] Field of Search .......... 315/171, 173, 194, 199, 315/200 R, 205, 227 R, 240, 291, 292, 293, DIG. 4; 307/252 N, 308

[56] References Cited
UNITED STATES PATENTS 3,706,913  12/1972  Malatchi............................ 315/292
3,715,623  2/1973  Szabo................................ 315/194

*Primary Examiner*—James W. Lawrence
*Assistant Examiner*—E. R. LaRoche
*Attorney, Agent, or Firm*—Stewart and Kolasch, Ltd.

[57] ABSTRACT

A dimmer circuit for lighting in which the brightness of a lamp or lamps is controlled by the potential across a storage capacitor. The potential may be varied by operating a switch and the rate of charge/discharge is such as to enable a user to adjust the brightness of a lamp progressively to a required level.

A number of dimmer circuits may be combined to form a lighting control system in which some switches control only one or two lamps while others are master switches for controlling several lamps. For example in a hotel suite master switches by the door and the bed may control all the lamps while a separate switch controls one reading lamp only.

15 Claims, 3 Drawing Figures

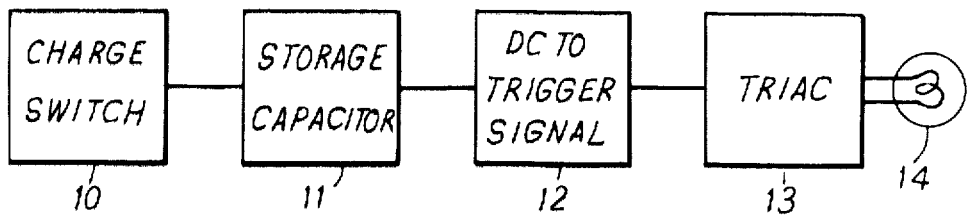
FIG. 1
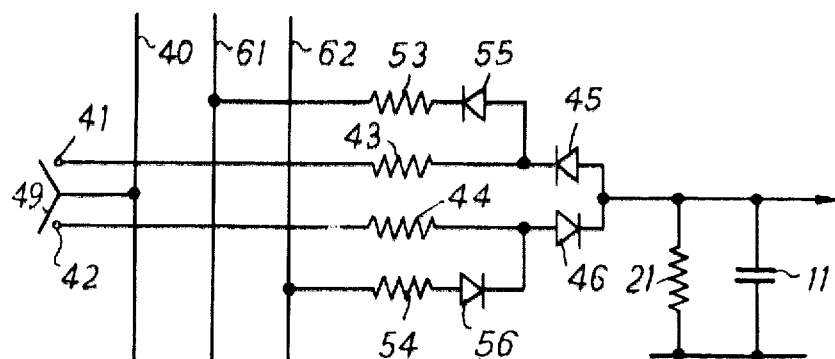
FIG. 3
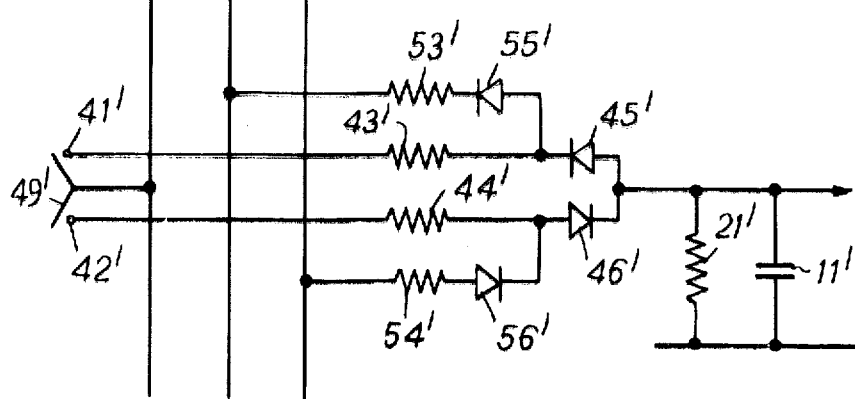

SWITCH-CONTROLLED CONTINUOUSLY PROGRESSIVE DIMMER CIRCUIT

The present invention relates to a dimmer control for lighting. It is particularly, but not exclusively, suitable for the control of room lighting, and a system of interconnected dimmer controls can provide a convenient form of control for the various lights of a hotel suite, for example.

Dimmer controls usually include a member, such as a potentiometer or a rheostat, having a moving part whose physical position in relation to the rest of the member determines the brightness of lights connected to it. Such a member is inconvenient to operate in comparison with an ordinary light switch and it is not a simple matter to combine such members to provide a system having both overall control of a plurality of lights and individual control of a selected light.

It is an object of the present invention to provide a switch controlled dimmer circuit.

It is a further object of the present invention to provide a lighting system wherein dimming control is provided for individual lamps independently of overall dimming control provided for the lighting system as a whole.

The present invention provides, in a first aspect, a dimmer circuit for lighting comprising a storage capacitor, conversion means connected to the storage capacitor for providing a control signal dependent on the potential across the storage capacitor, power control means in an output circuit suitable for connection in the power supply circuit of a lamp, the power control means being connected to the conversion means and, in operation, determining the power available in the output circuit in dependence upon the control signal, and switch-controlled charge-varying means connected to the storage capacitor and manually operable to permit progressive alteration of the charge stored by the storage capacitor at a rate such as to enable the user to adjust the light emitted by a lamp in the output circuit progressively to a required level.

The time constant for charge leakage from the storage capacitor may be at least 10 hours.

The power control means may comprise a thyristor or a triac connected to receive the control signal on its trigger electrode. The conversion means may comprise an amplifier connected as an impedance converter with an input of very high impedance connected across the storage capacitor and an output of relatively low impedance connected to a variable phase delay network for providing the control signal.

The switch-controlled charge-varying means may comprise a switch having a first terminal connected to the storage capacitor via a first unidirectional element, a second terminal connected to the storage capacitor via a second unidirectional element and a common terminal switchable to either the first or the second terminals, the common terminal being connected to a source of alternating current and the unidirectional elements being so biased that connection of the alternating current source, in operation, to the storage capacitor via one of the unidirectional elements causes it to charge and connection via the other unidirectional element causes the storage capacitor to discharge.

The storage capacitor may have one of its terminals connected to a reference potential and its other terminal connected via the unidirectional elements to the switch. The potential of the source of alternating current may alternate between the reference potential and a maximum potential to which the storage capacitor is to be charged.

There may be a resistor in series with each of the unidirectional elements whereby the rate of charge and discharge of the storage capacitor may be determined.

The dimmer may include a plurality of switches each having a common terminal for connection to the source of alternating current and each having first and second terminals connected to the storage capacitor via unidirectional elements individual to each terminal. Resistors of different values may be connected in series with the unidirectional elements so that the switches charge or discharge the storage capacitor at different rates or so that a switch charges the storage capacitor at a rate different from the rate of discharge for that switch.

The present invention further provides, in a second aspect, a lighting control system comprising first and second dimmer circuits according to the first aspect of the invention with associated lamps, the first and second switch-controlled charge-varying means being connected to the respective storage capacitors to provide independent dimmer control of their respective lamps, and third switch-controlled charge-varying means connected to both the storage capacitors to provide simultaneous dimmer control of both lamps independently of the first and second switch-controlled charge-varying means.

Buffer means may be included between each switch controlled charge-varying means and the or each storage capacitor to which it is connected. The buffer means may comprise the above-mentioned unidirectional elements.

An embodiment of the invention will now be described in detail, by way of example, with reference to the accompanying drawings in which:

FIG. 1 is a block diagram of a dimmer control,

FIG. 3 is a circuit diagram for a system of dimmer controls having an overall switch.

Figure 2:
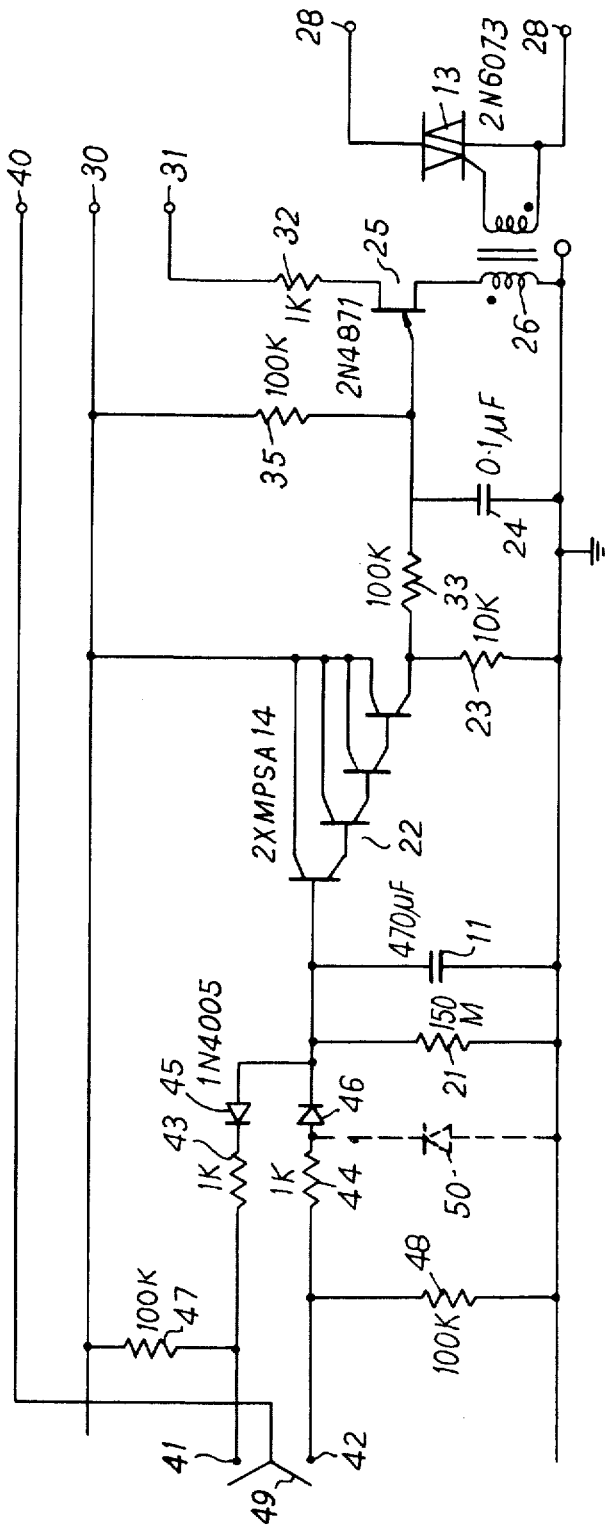
FIG. 2 is a circuit diagram of the dimmer control of FIG. 1.

The dimmer control circuit of FIG. 1 sets the brightness of a lamp 14 in dependence on the potential across a storage capacitor 11, by means of a conversion circuit 12 for converting the potential across the storage capacitor 11 into a triggering signal which is used to control the lamp 14 via a triac 13. A switch controlled charging and discharging circuit 10 is used to vary the charge on the storage capacitor 11 and hence the brightness of the lamp 14.

Referring now to FIG. 2, the storage capacitor 11 is an electrolytic capacitor of 470 $\mu$F with a 150 M$\Omega$ resistor 21 connected in parallel. The time constant of this RC combination is large and over a period of a few hours any leakage of charge through the resistor 21 has a negligible effect on the potential across the storage capacitor 11. A very high input impedance amplifier 22 comprising two Darlington pair amplifiers in cascade is connected across the storage capacitor 11 and provides a low impedance voltage-following output across a 10 K$\Omega$ resistor 23. The amplifier 22 is also connected to a positive DC power supply rail 30. The voltage across the resistor 23 is used as an output to control a trigger pulse producing circuit. Other kinds of very high input impedance amplifier can be used in place of the amplifier 22, and in particular an F.E.T. could be used. The output of the amplifier 22 is connected to a 0.1 μF timing capacitor 24 via a 100 KΩ resistor 33.

The trigger pulse producing circuit has a synchronising input 31 on which a full-wave rectified mains signal, clipped to 20 V, is supplied. A unijunction transistor 25 type 2N4871 is connected in series with a primary winding of a pulse transformer 26 and a 1 KΩ resistor 32 across the synchronising input 31. The timing capacitor 24 is connected to the gate of the unijunction transistor 25 and both are connected via a 100 KΩ resistor 35 to the positive DC supply rail 30. In operation the timing capacitor 24 is charged via the 100 KΩ resistor 33 from the output of the amplifier 22. As soon as the potential across the timing capacitor reaches the threshold value of the unijunction transistor 25 the transistor conducts to discharge the timing capacitor 24.

Synchronisation with the mains alternating voltage is obtained via the 1 KΩ resistor 32 connected to the unijunction transistor 25. When the full-wave rectified alternating voltage on the input 31 falls to zero, any potential developed on the capacitor 24 is discharged through the unijunction transistor 25 so that the charging cylce always starts from the same point in the mains waveform. The maximum potential reached by the full wave rectified waveform may be clipped to 20 volts using a diode clamping circuit or a Zener diode voltage control circuit. The resistor 35 improves the operating range of the pulse producing circuit by making allowance for the characteristics of the unijunction transistor 25. Other types of unijunction transistor may need different values for the resistor 35 and perhaps also the resistor 32. The discharge pulse is taken from a secondary winding of the pulse transformer to control the gate of the triac 13. The triac 13 is connected in the power supply of a lamp via output terminals 28.

The timing of the control pulse after the zero pulse in the synchronising signal is fully variable from almost instantaneously after the zero signal through values representing various proportions of conduction by the triac 13 during each half cycle to no conduction at all, i.e. fully off.

A half-wave rectified mains signal also clipped to 20 V is applied to a lead 40 connected to the common terminal 49 of a two-way switch. The switch is spring biased so that the terminal 49 is normally disconnected but an operator may press the common terminal towards either a first terminal 41 or a second terminal 42. The terminals 41 and 42 are connected via respective 1 KΩ resistors 43 and 44 in series with respective oppositely biased diodes 45 and 46 to the storage capacitor 11. The diode 45 is biased so that the zero voltage portions of the signal on the lead 40 may be connected to discharge the storage capacitor 11 via the 1 KΩ resistor 43 while the diode 46 is biased so that the 20 V portions of the signal on the lead 40 may be connected to charge the storage capacitor 11 via the 1 KΩ resistor 44. The first and second terminals 41 and 42 are also connected via 100 KΩ resistors to respective sides of the DC power supply so that the diodes 45 and 46 are normally reverse biased. This is important for minimising leakage of charge through poor insulation between the leads to the three terminals of the switch. The diodes 45 and 46 should be silicon types such as type 1N4005.

The time constants of the switch controlled charging and discharging circuits are chosen so that an operator of the switch can progressively vary the charge on the storage capacitor 11 (and hence the brightness of the lamp receiving power via the triac 13) and stop the progressive variation when a desired level of brightness is reached. A user of the dimming circuit simply presses the switch one way to brighten up the lamp and the other way to dim.

In a modification of the circuit of FIG. 2 the lead 40 may be connected to a low voltage AC source (say 20 volts) whose potential varies on either side of earth. To prevent the electrolytic capacitor 11 being charged up the wrong way a clamping diode 50 (shown dotted) is then needed connecting the junction of the resistor 44 and the diode 46 to earth. When rectified AC is used the diode 50 is not needed.

The system shown in FIG. 3 comprises two dimming circuits having storage capacitors 11 and 11' with respective switches having common terminals 49 and 49'. Their respective conversion circuits 12 and 12', triacs 13 and 13' and lamps 14 and 14' are not shown. Each storage capacitor 11 or 11' may be controlled by its own switch independently of the other dimming circuit but an overall switch having a common terminal 59 connected to the lead 40 is connected to control both dimming circuits. The overall switch has a first terminal 51 connected to a first control lead 61 and a second terminal connected to a second control lead 62. These control leads may be extended to as many dimmer circuits as are desired to be controlled by the overall switch. At each dimmer circuit the control lead 61 is connected via a resistor 53, and a diode 55 to the diode 45 and thence to the storage capacitor 11, while the control lead 62 is connected via a resistor 54 and a diode 56 to the diode 46 and thence to the storage capacitor 11. The values of the resistors 53, 54, etc. need not be the same as the resistors 43, 44, etc. Different time constants for dimming can be selected for each switch. It may, for example, be desirable for the discharge time of the overall switch to be as short as possible to ensure that all lamps are rapidly turned off by it. The overall control leads 61 and 62 are connected to the storage capacitors via two diodes in series to minimise leakage of charge from the storage capacitors.

More complex systems can be devised on the general lines of the system shown. For example, a hotel suite may have a main light, a bathroom light, two bedside lights and a dressing-table light. A main switch by the door may be connected to turn out all the lights or to brighten up all the lights except the bathroom light. Main switches by the bed may be connected to brighten or dim all the lights except the bathroom light and each of the bathroom, the dressing-table and the bedside lights may have its own switch connected to operate that light only. No individual switch need be supplied for the main lights. Other systems can be devised to suit the circumstances of any particular installation.

Waht is claimed is:

1. A dimmer circuit comprising:
output power control means adapted for connection in a power supply circuit of a lamp;
a storage capacitor;
conversion means connected to said storage capacitor and to said output power control means to cause said output power control means to set the power available to a lamp in whose power supply circuit the output power control means is connected, to a level dependent on te potential across said storage capacitor; and manually-operable switch controlled charge-varying means connected to said storage capacitor and operable in a first mode to allow the charge on said storage capacitor to remain unaltered and in a second mode to cause progressive and continuous alteration of said charge at such a rate as to enable a user to progressively and continuously vary the brightness of said lamp to a required level by employing said second mode of operation and then to retain said level by switching to said first mode.

2. A dimmer circuit according to claim 1, wherein said storage capacitor has a time constant for charge leakage of at least 10 hours.

3. A dimmer circuit according to claim 1, wherein said conversion means comprises an amplifier having and input of very high impedance connected across said storage capacitor and an output of relatively low impedance.

4. A lighting control system comprising first and second dimmer circuits according to claim 1 with associated lamps, the switch-controlled charge-varying means of said first and second dimmer circuits being connected to their respective storage capacitors to provide independent dimmer control of their respective lamps, and an additional switch-controlled charge-varying means connected to both said storage capacitors to provide simultaneous dimmer control of both lamps independently of said switch-controlled charge-varying means of said first and second dimmer circuits.

5. A dimmer circuit according to claim 1 wherein said switch controlled charge-varying means can be selectively actuated in said second mode of operation to either charge said storage capacitor to said required level or to discharge said storage capacitor to said required level.

6. A dimmer circuit according to claim 1, wherein said output power control means comprises a triggerable control element having a trigger electrode, said trigger electrode being connected to the conversion means.

7. A dimmer circuit according to claim 6, wherein said triggerable control element is a triac.

8. A dimmer circuit according to claim 6, wherein said conversion means includes a variable phase delay network adapted to provide a trigger signal to said trigger electrode at a phase position determined by said potential across said storage capacitor.

9. A dimmer circuit according to claim 1, wherein said switch-controlled charge-varying means comprises a source of alternating current, a first unidirectional element, a second unidirectional element, and a switch having a first terminal connected to said storage capacitor via said first unidirectional element, a second terminal connected to said storage capacitor via said second unidirectional element and a common terminal switchable to either said first or said second terminals to effect said second mode of operation, said common terminal being connected to said source of alternating current and said unidirectional elements being so biased that connection of said alternating current source, in operation, to said storage capacitor via one of said unidirectional elements causes said storage capacitor to charge and connection via said other unidirectional element causes said storage capacitor to discharge.

10. A dimmer circuit according to claim 9, having a resistor connected in series with each of said unidirectional elements to determinine the rate of charge and discharge of said storage capacitor.

11. A dimmer circuit according to claim 9 including a plurality of switches each having a common terminal adapted for connection to said source of alternating current and each having first and second terminals connected to said storage capacitor via unidirectional elements individual to each terminal.

12. A dimmer circuit according to claim 11, wherein resistors of different values are connected in series with said unidirectional elements so that said switches vary the charge of said storage capacitor at different rates.

13. A dimmer circuit according to claim 9, wherein said storage capacitor has one of its terminals connected to a reference potential and the other one of its terminal connected via said unidirectional elements to said switch.

14. A dimmer circuit according to claim 13, wherein said source of alternating current is adapted to produce a current having a potential which alternates between said reference potential and a maximum potential to which said storage capacitor is to be charged.

15. A dimmer circuit according to claim 13, including a unidirectional clamping element wherein said source of alternating current is adapted to produce a current having a potential which alternates about said reference potential while said storage capacitor has its said other terminal clamped to said reference potential by said unidirectional clamping element to protect said storage capacitor from being charged to a potential of the wrong polarity.

* * * * *